DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 1, 1970

881 O.G. 22

T881,006
IODINE BLEACH FOR COLOR FILM PROCESSING

Charleton C. Bard, 74 Cornwall Lane, Rochester, N.Y. 14617

Filed May 8, 1970, Ser. No. 35,910
Int. Cl. G03c *5/32*
U.S. Cl. 96—60
No Drawing. 6 Pages Specification

Silver images in photographic emulsion layers are bleached with an aqueous solution of iodine and pyrrolidinone or of iodine and polyvinyl pyrrolidinone to render the silver removable with silver halide solvent. The iodine-containing bleach solutions are particularly useful in reversal color processes in which a first silver bleach solution, such as ferricyanide solution, is used followed by hypo to remove most of the silver followed by the iodine-containing bleach to effect removal of traces of silver remaining in the layers.